(12) United States Patent
Liu et al.

(10) Patent No.: US 8,929,949 B2
(45) Date of Patent: Jan. 6, 2015

(54) MOBILE TERMINAL AND TRANSMISSION PROCESSING METHOD THEREOF

(75) Inventors: Yong Liu, Beijing (CN); Chunyu Song, Beijing (CN)

(73) Assignees: Lenovo (Beijing) Limited, Beijing (CN); Beijing Lenovo Software Ltd., Beijing (CN)

( * ) Notice: Subject to any disclaimer, the term of this patent is extended or adjusted under 35 U.S.C. 154(b) by 0 days.

(21) Appl. No.: 13/818,910

(22) PCT Filed: Sep. 1, 2011

(86) PCT No.: PCT/CN2011/079251
§ 371 (c)(1),
(2), (4) Date: Feb. 25, 2013

(87) PCT Pub. No.: WO2012/028107
PCT Pub. Date: Mar. 8, 2012

(65) Prior Publication Data
US 2013/0157719 A1 Jun. 20, 2013

(30) Foreign Application Priority Data
Sep. 2, 2010 (CN) .......................... 2010 1 0272247

(51) Int. Cl.
| H04M 1/00 | (2006.01) |
| H04B 1/38 | (2006.01) |
| G06F 3/01 | (2006.01) |
| H04M 1/725 | (2006.01) |
| H04M 1/02 | (2006.01) |

(52) U.S. Cl.
CPC ....... *H04M 1/0202* (2013.01); *G06F 2203/011* (2013.01); *G06F 3/017* (2013.01); *H04M 1/72522* (2013.01); *H04M 2250/12* (2013.01)
USPC ...................................... 455/556.1; 455/90.1

(58) Field of Classification Search
USPC ................... 455/90.1, 90.3, 550.1, 556.1
See application file for complete search history.

(56) References Cited

U.S. PATENT DOCUMENTS
| 8,498,675 B2 * | 7/2013 | Huang ........................... 455/567 |
| 2010/0164894 A1 * | 7/2010 | Kim et al. ..................... 345/173 |

FOREIGN PATENT DOCUMENTS
| CN | 1626029 A | 6/2005 |
| CN | 101321352 A | 12/2008 |
| CN | 101693147 A * | 4/2010 |
| CN | 101710914 A | 5/2010 |
| CN | 101789990 A * | 7/2010 |

OTHER PUBLICATIONS

International Search Report and Written Opinion for PCT Application No. PCT/CN2011/079251, dated Dec. 8, 2011, 11 pages.

* cited by examiner

*Primary Examiner* — Quochien B Vuong
(74) *Attorney, Agent, or Firm* — Westman, Champlin & Koehler, P.A.

(57) ABSTRACT

The present disclosure provides a mobile terminal and a transmission processing method thereof. The mobile terminal includes: a casing; a motion sensing unit provided within the casing and configured to gather motion data of the mobile terminal; a judging unit connected to the motion sensing unit and configured to judge whether the mobile terminal is performing a predetermined motion based on the motion data gathered by the motion sensing unit; a generating unit connected to the judging unit and configured to generate an operation instruction when the judging unit judges that the mobile terminal is performing the predetermined motion; and a transmitting unit connected to the generating unit and configured to transmit the operation instruction to another terminal. The another terminal performs a vibration operation in response to the operation instruction. With the embodiments of the present invention, an improved efficiency of user input can be achieved.

6 Claims, 2 Drawing Sheets

US 8,929,949 B2

MOBILE TERMINAL AND TRANSMISSION PROCESSING METHOD THEREOF

CROSS-REFERENCE TO RELATED APPLICATION

This Application is a Section 371 National Stage Application of International Application No. PCT/CN2011/079251, filed 1 Sep. 2011 and published as WO 2012/028107 A1 on 8 Mar. 2012, in Chinese, the contents of which are hereby incorporated by reference in their entirety.

TECHNICAL FIELD

The present invention relates to communication technology, and more particularly, to a mobile terminal and a transmission processing method thereof.

BACKGROUND

Currently, with continuous development of communication and computer technology, a user is able to perform an input operation and communicate with another user in various ways.

However, it has been recognized that the conventional methods have at least the following drawbacks.

In instant communication for example, a user usually needs two input operations during an input process if he/she wants to express his/her current emotion. The user first inputs a content to be sent, and then expresses his/her emotion by performing an additional operation. For example, in the QQ chat application, some icons can be selected to express anger, and the font, color or size of the content to be sent can also be selected to express his/her emotion. However, in the next input process, his/her emotion may have been changed and, at this time, the above two input operations need to be repeated. In this case, the input operations for the user are complicated and inefficient.

The above problems also exist in many other communication applications.

SUMMARY

An object of the present invention is to provide a mobile terminal and a transmission processing method thereof, which are capable of implementing user input operations with reduced complexity and improved efficiency.

In order to achieve the above object, according to an embodiment of the present invention, a mobile terminal is provided. The mobile terminal includes: a casing; a motion sensing unit provided within the casing and configured to gather motion data of the mobile terminal; a judging unit connected to the motion sensing unit and configured to judge whether the mobile terminal is performing a predetermined motion based on the motion data gathered by the motion sensing unit; a generating unit connected to the judging unit and configured to generate an operation instruction when the judging unit judges that the mobile terminal is performing the predetermined motion; and a transmitting unit connected to the generating unit and configured to transmit the operation instruction to another terminal, the another terminal performing a vibration operation in response to the operation instruction.

In an embodiment, the another terminal is provided with a motor and the operation instruction causes the another terminal to control the motor to vibrate.

In an embodiment, the another terminal is provided with a display unit configured to display an object and a display processing unit, and the operation instruction causes the another terminal to control, via the display processing unit, the object to be displayed on the display unit in a vibrated manner.

In the above mobile terminal, the generating unit includes: a vibration intensity parameter determining unit configured to determine a vibration intensity parameter based on the motion data; wherein the vibration intensity parameter is included in the operation instruction, and the another terminal performs the vibration operation at a vibration intensity indicated by the vibration intensity parameter.

In order to achieve the above object, according to an embodiment of the present invention, a mobile terminal is provided. The mobile terminal includes: a casing; a first gathering unit provided within the casing and configured to gather an input operation from a user; a second gathering unit provided within the casing and configured to gather an input parameter when the user performs the input operation; a first generating unit connected to the first gathering unit and configured to generate an input content based on the gathered input operation; a second generating unit connected to the second gathering unit and configured to generate an operation instruction based on the gathered input parameter; and a transmitting unit connected to the first generating unit and the second generating unit and configured to transmit the input content and the operation instruction to a another terminal, the another terminal outputting the input content and performing a control operation based on the operation instruction.

In the above mobile terminal, the first gathering unit is a pointer input device.

In the above mobile terminal, the input parameter is strength of a force at which the pointer input device is pressed or a frequency at which the pointer input device is pressed.

In the above mobile terminal, the first gathering unit is a voice gathering device.

In the above mobile terminal, the input parameter is a volume or speed at which the user performs a voice input.

In the above mobile terminal, the operation instruction causes the another terminal to change an output parameter for the input content, or to output another content while outputting the input content, or to change an output environment for the input content, or to perform, while outputting the input content, an operation independent of the output of the input content.

In the above mobile terminal, the input content is a content to be outputted by the another terminal in a character string form, and the operation instruction causes the another terminal to change a font, size, color or character format of the input content, or output another content while outputting the input content, or change a background color or a background image of a display box in which the input content is displayed, or control the display box to vibrate while outputting the input content, or control a motor provided within a casing of the another terminal to vibrate.

In the above mobile terminal, the input content is a content to be outputted by the another terminal in a voice form, and the operation instruction causes the another terminal to change a volume, speed or mode for playing the input content, or output another content while outputting the input content, to change a background color or a background image of an interface of a play unit for playing the input content, or change a color, font or size of a filename of the input content displayed on the interface of the play unit, to control the interface to vibrate while outputting the input content, or control a motor provided within a casing of the another terminal to vibrate.

In order to achieve the above object, according to an embodiment of the present invention, a transmission processing method in a mobile terminal is provided. The method includes: gathering motion data of the mobile terminal; judging whether the mobile terminal is performing a predetermined motion based on the gathered motion data; generating an operation instruction when it is judged that the mobile terminal is performing the predetermined motion; and transmitting the operation instruction to another terminal, the another terminal performing a vibration operation in response to the operation instruction.

In the above method, the another terminal is provided with a motor and the operation instruction causes the another terminal to control the motor to vibrate, or the another terminal is provided with a display unit configured to display an object and a display processing unit, and the operation instruction causes the another terminal to control, via the display processing unit, the object to be displayed on the display unit in a vibrated manner.

In order to achieve the above object, according to an embodiment of the present invention, a transmission processing method in a mobile terminal is provided. The method includes: gathering an input operation from a user and an input parameter when the user performs the input operation; generating an input content based on the gathered input operation; generating an operation instruction based on the gathered input parameter; and transmitting the input content and the operation instruction to another terminal, the another terminal outputting the input content and performing a control operation based on the operation instruction.

In the above method, the operation instruction causes the another terminal to change an output parameter for the input content, or to output another content while outputting the input content, or to change an output environment for the input content, or to perform, while outputting the input content, an operation independent of the output of the input content.

The embodiments of the present invention have at least the following advantageous effects.

According to the embodiments of the present invention, the user is able to input content to be sent and an instruction for controlling the operation of another terminal through a single input operation, and then transmit them to the another terminal. Compared with the conventional methods which require two or more operations, the user's input operation is simplified and improved in efficiency.

With the present invention, communication functions of the mobile terminal can be extended so that communications between users become more vivid and real. Instead of simple text or emotion expressions. It is now possible to provide a communication style as if the users talk with each other in a "face to face, heart to heart" manner in which the users can experience and feel the emotions of each other.

DETAILED DESCRIPTION OF THE EMBODIMENTS

According to an embodiments of the present invention, in a mobile terminal, a predetermined instruction is obtained by gathering a user's operation and then transmitted to another terminal. The another terminal can operate in response to the instruction.

Figure 1:
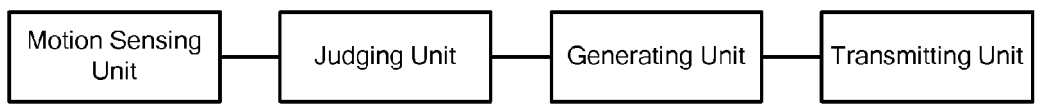
FIG. 1 is a schematic block diagram of a mobile terminal according to the first embodiment of the present invention.

As shown in FIG. 1, the mobile terminal according to the first embodiment of the present invention includes: a casing (not shown); a motion sensing unit provided within the casing and configured to gather motion data of the mobile terminal; a judging unit connected to the motion sensing unit and configured to judge whether the mobile terminal is performing a predetermined motion based on the motion data gathered by the motion sensing unit; a generating unit connected to the judging unit and configured to generate an operation instruction when the judging unit judges that the mobile terminal is performing the predetermined motion; and a transmitting unit connected to the generating unit and configured to transmit the operation instruction to another terminal. The another terminal may perform a vibration operation in response to the operation instruction.

According to the above embodiment, the mobile terminal uses a motion sensing unit provided within its casing to detect the motion data of the user. Upon determining that the mobile terminal is performing a predetermined motion (e.g., the user shakes the mobile terminal up and down or swings it left and right or rotates it) based on the motion data, the mobile terminal generates an instruction corresponding to the predetermined motion, and then transmits the instruction to the another terminal via a communication network. The another terminal may perform a vibration operation after receiving the instruction.

In an embodiment of the present invention, the predetermined motion can be defined by various motion parameters, such as one or more of speed, acceleration and displacement. Thus, the motion sensing unit can be a speed sensor, an acceleration sensor, a displacement sensor or any combination thereof.

The following example will be given in which the motion sensing unit is an acceleration sensor.

For the mobile terminal, a predetermined motion (e.g., a motion having an acceleration above 2 m/s$^2$) may be preset, and an instruction to be generated when the predetermined motion occurs may be predefined.

For example, when the user swings the mobile terminal, the acceleration sensor detects the acceleration of the mobile terminal. If the acceleration value detected by the acceleration sensor is larger than 2 m/s$^2$, the judging unit judges that the mobile terminal is performing the predetermined motion (a motion having acceleration above 2 m/s$^2$). At this time, based on this judgment, the generating unit generates an instruction for instructing another terminal corresponding to the mobile terminal to perform a corresponding operation. The transmitting unit transmits the instruction to the another terminal via a communication network. The another terminal performs a vibration operation after receiving the instruction.

In an exemplary embodiment of the present invention, there may be two types of vibration operations: vibration of the another terminal itself, and vibration of an object on a display screen of the another terminal (e.g., a dialog box on an instant communication interface).

Hereafter, the two types of vibration operations will be detailed.

In the first type of vibration operation, the another terminal includes a motor provided within its casing for enabling vibration. The another terminal controls the motor to vibrate in response to the received instruction.

In the second type of vibration operation, the another terminal has a display unit and a display processing unit. The display unit displays an object on a display screen. In response to the received instruction, the another terminal controls, via the display processing unit, the object to be displayed on the display screen in a vibrated manner.

In an embodiment of the present invention, the object can be any of various application interfaces or objects on such interface, such as a Word editing interface or a dialog window of an instant communication application (e.g., QQ and MSN). The present invention is not limited thereto.

In the above embodiment, the same instruction will be transmitted for all predetermined motions (e.g., all motions having accelerations above 2 m/s$^2$). In order to further distinguishing motions, according to an exemplary embodiment of the present invention, a vibration intensity parameter determining unit is further provided in the generating unit for determining a vibration intensity parameter based on the motion data.

The vibration intensity parameter may be carried in the operation instruction so as to be transmitted to the another terminal. The another terminal vibrates at a vibration intensity indicated by the vibration intensity parameter. As such, for all motions having accelerations above 2 m/s$^2$, different vibration intensities may be determined based on the different values of the accelerations. Accordingly, the another terminal may vibrate at different intensities. In this way, the motions can be distinguished, and the feeling or emotion of the user of the mobile terminal can be expressed in a more vivid manner.

Below, a specific example will be given.

It is assumed that for a communication terminal, a predetermined motion and vibration intensity parameters corresponding to different motion data are defined in advance. A motion having acceleration over 2 m/s$^2$ is defined as the predetermined motion, and a relation between different motion data and corresponding vibration intensity parameters is shown in the table below:

| Acceleration Data (a) | Vibration Intensity Parameter |
|---|---|
| 3 > a ≥ 2 | x1 |
| 4 > a ≥ 3 | x2 |
| 5 > a ≥ 4 | x3 |
| ... | ... |

When the user swings the mobile terminal, the acceleration sensor detects the acceleration of the mobile terminal. If the acceleration value detected by the acceleration sensor is larger than 2 m/s$^2$, the judging unit judges that the mobile terminal is performing the predetermined motion (a motion having acceleration over 2 m/s$^2$). The vibration intensity parameter determining unit further determines the vibration intensity parameter based on the specific value of the acceleration data. For example, when the acceleration is 2.3 m/s$^2$, the vibration intensity parameter has the value of x1, and when the acceleration is 4.2 m/s$^2$, the vibration intensity parameter has the value of x3. The value of the vibration intensity parameter is carried in the instruction and transmitted to the another terminal via a communication network. The another terminal extracts the vibration intensity parameter from the instruction and controls the rotation speed and the rotation interruption frequency of the motor based on the vibration intensity parameter to achieve a vibration at this intensity. Alternatively, the another terminal can control the vibration magnitude of the object on the display screen to achieve a vibration at this intensity.

It should be noted that the above vibration intensity parameter can be directly expressed as rotation speed, rotation interruption frequency or vibration magnitude. Alternatively, it can be a vibration level parameter. In this case, the another node determines a corresponding rotation speed, rotation interruption frequency or vibration magnitude from the vibration level parameter.

Also, in an embodiment of the present invention, the relation between the vibration intensity parameter and the motion data is not limited to the above example. Preferably, the larger the motion data is, the larger the vibration intensity parameter will be, such that the actual operation by the user can be better reflected.

Figure 2:
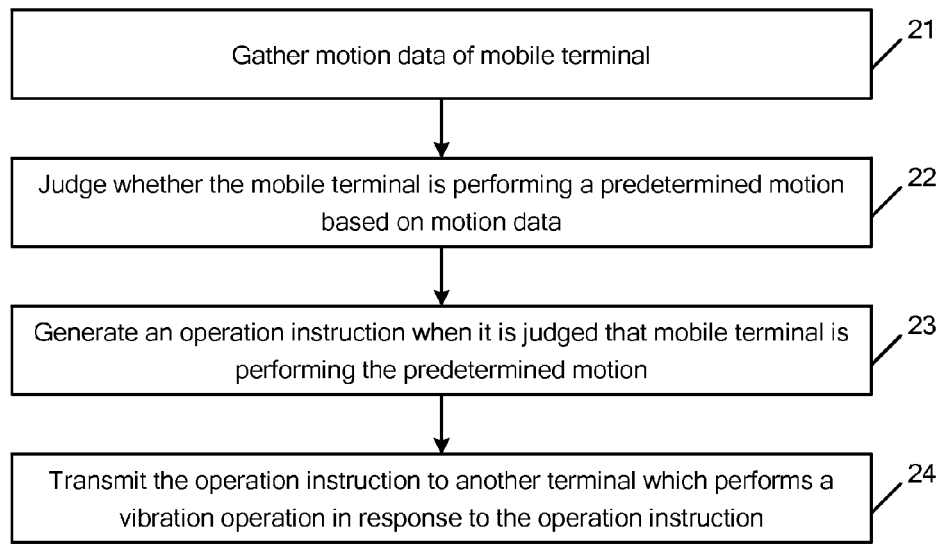
FIG. 2 is a flowchart illustrating a transmission processing method in the mobile terminal according to the first embodiment of the present invention.

FIG. 2 is a flowchart illustrating the transmission processing method in the mobile terminal according to the first embodiment of the present invention. As shown in FIG. 2, the method includes the following steps.

At step 21, motion data of the mobile terminal is gathered.

At step 22, it is judged whether the mobile terminal is performing a predetermined motion based on the gathered motion data.

At step 23, an operation instruction is generated when it is judged in the step 22 that the mobile terminal is performing the predetermined motion.

At step 24, the operation instruction is transmitted to another terminal, and the another terminal performs a vibration operation in response to the operation instruction.

Figure 3:
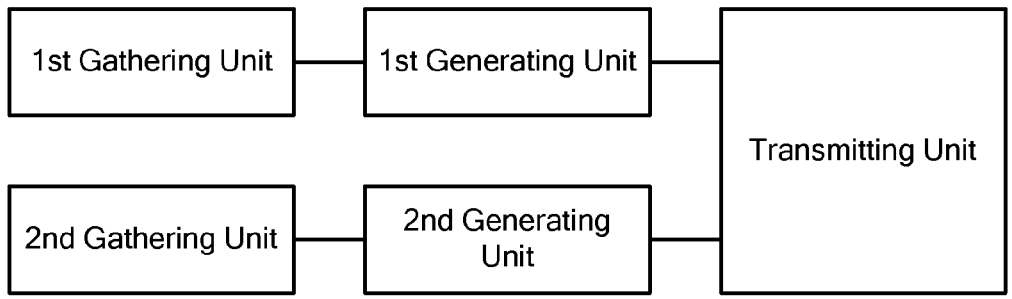
FIG. 3 is a schematic block diagram of a mobile terminal according to the second embodiment of the present invention.

FIG. 3 shows a mobile terminal according to the second embodiment of the present invention. The mobile terminal includes: a casing (not shown); a first gathering unit provided within the casing and configured to gather an input operation from a user; a second gathering unit provided within the casing and configured to gather an input parameter when the user performs the input operation; a first generating unit connected to the first gathering unit and configured to generate an input content based on the gathered input operation; a second generating unit connected to the second gathering unit and configured to generate an operation instruction based on the gathered input parameter; and a transmitting unit connected to the first generating unit and the second generating unit and configured to transmit the input content and the operation instruction to another terminal. The another terminal outputs the input content and performs a control operation based on the operation instruction.

In an embodiment of the present invention, the input operation by the user and the input parameter when the user performs the input operation are gathered first. In an embodiment of the present invention, the input operation and the input parameter may be in various forms. Some examples will be given in the following.

The input device can be a pointer input device, such as a keyboard or a touch screen.

If the mobile terminal has a keyboard, the user may perform the input operation through the keyboard. In this case, the input content can be for example characters or texts input by the user through the keyboard, and the input parameter may be strength of a force pressing keys or a frequency at which keys are pressed when the user performs the input operation through the keyboard.

The strength of the force pressing keys may be detected by a pressure sensor provided below the keys.

The press on a key may be detected in various methods including one or more of the following examples.

In the first method, a key scan circuit is provided in the keyboard. It is determined whether a key is pressed from scan signals by the key scan circuit.

In the second method, when a key is pressed, a code is transmitted to a host computer. Thus, it is also possible to determine whether a key is pressed depending on whether a code is transmitted from the keyboard to the host computer.

The frequency for pressing keys may be determined as follows.

The frequency for pressing keys may be determined from the number of times a key-pressing operation by the user is detected within a unit time. For example, if the unit time is 2 s, and it is detected that the user presses the keys five times within 2 s, it is determined that the frequency for pressing keys is 2.5 times per second. The length of the unit time may be selected depending on different requirements.

Alternatively, the frequency for pressing keys may be determined from a time interval during which the user presses keys for n times. For example, when it is detected that the user presses a key, a timer is started. When it is detected that the user presses keys for the n-th time, the value of the timer is read, e.g., 0.5 s. In this case, it is determined that the frequency for pressing keys is 2 n times per second. The value of n may be selected depending on different requirements.

If the mobile terminal has a touch screen, the user may perform various input operations through the touch screen. In this case, the input content can be for example characters or texts input by the user through the touch screen, and the input parameter can be strength of a force pressing the touch screen or a frequency for pressing the touch screen when the user performs the input operation through the touch screen.

The strength of a force pressing the touch screen may be detected by a sensor provided below the touch screen. The frequency for pressing the touch screen may be determined based on a frequency at which information is exchanged between the touch screen and the main board. The details of these operations will be omitted here.

If the mobile terminal has a voice gathering device, such as a microphone, the user can perform input operations through the voice gathering device. In this case, the input content may be a character string obtained by applying voice recognition to the user's voice, and the input parameter can be a volume or speed at which the user performs a voice input through the voice gathering device.

The volume may be detected by a volume detection element. Such volume detection element is widely used in microphones and various noise monitor devices and thus will not be detailed here.

The speed may be measured by gathering voice in a time period, converting the voice into a character string through voice recognition and dividing the number of characters in the character string by the length of the time period.

The input parameter gathered by the second gathering unit may be independent of input device or input content. For example, the second gathering unit may be a human biometrical parameter gathering unit for gathering a biometrical parameter when the user performs the input operation, such as frequency of heartbeat and frequency of respiration. Such parameters can directly reflect the user's emotion.

The present invention is not limited to the above methods for detecting the various input parameters. Other conventional detection methods may also be applied to the mobile terminal according to the embodiment of the present invention.

The above examples are for illustrative purpose. There are currently various methods for performing input to a device. Any of these methods requires the user's participation. Thus, there will be some parameter to be gathered with respect to the user's participation.

After gathering the input operation from the user and gathering the input parameter when the user performs the input operation, the mobile terminal generates an input content based on the gathered input operation, generates an operation instruction based on the gathered input parameter, and transmits the input content and the operation instruction to another terminal. The another terminal outputs and operates accordingly. Herein, the input content can be generated based on the gathered input operation by using any appropriate method known in the art. For example, an input operation by the user on a keyboard may be gathered to obtain a character string, or an input operation by the user through a voice gathering device may be gathered to obtain a character string (through voice recognition) or an audio file. Details thereof will be omitted here.

According to an embodiment of the present invention, the mobile terminal generates an operation instruction based on the gathered input parameter while generating the input content.

In an embodiment of the present invention, the operation instruction causes the another terminal to change an output parameter of the input content, or to output another content while outputting the input content, or to change an output environment for the input content, or to perform, while outputting the input content, an operation independent of the output of the input content, which will be described in the following.

Case 1

In Case 1, the control operation may be a control operation with respect to the input content itself. The operation instruction causes the another terminal to change the output parameter of the input content using an output unit. The control operation and the output unit will differ with change in the form of the input content, which will be described in the following example.

If the input content is a character string, the output unit may be for example a display, on which an application interface or an object is displayed to output the character string. Here the application can be any of various applications capable of outputting characters, such as instant communication software or text editing software. Upon receiving the operation instruction transmitted from the mobile terminal, the another terminal controls, in response to the operation instruction, to change color, size and font of the character string output on the application interface, for example, as if the user performs these operations by clicking command buttons or selecting menus on the application interface. Other character formats of the character string (such as darkened, bold and italic formats) may also be changed.

If the input content is an audio file, the output unit may be for example an audio output device such as a speaker. Upon receiving the operation instruction transmitted from the mobile terminal, the another terminal controls, in response to the operation instruction, to change volume, speed or other parameters such as mode for the audio output device to play the audio file by using audio playing software. Such operations are carried out as if the user clicks a volume up button in the audio playing software using a mouse or selects a menu item.

Case 2

In Case 2, the operation instruction causes the another terminal to output another content while outputting the received input content. Preferably, the another content is related to the input content. For example, while playing a sound file, the another terminal may play a background sound (such as a sound of wind, thunder, rain or laugher) using audio playing software. While displaying a character string, the another terminal may control text output software to further display, for example, a picture of fire or display a text reading "he/she is angry".

Case 3

In Case 3, the operation instruction causes the another terminal to change an output environment for the input content, without changing the input content, which will be described in the following example.

When the input content is for example a character string, the another terminal changes, in response to the received operation instruction, a background color or a background image of a display box (e.g., a dialog box for instant communication software) in which the input content is displayed or control the display box to vibrate while outputting the received input content.

When the input content is for example an audio file, the another terminal changes, in response to the received operation instruction, a background color or a background image of an interface of an audio player, changes a color, font or size of a filename of the input content displayed on the interface, or controls the interface to vibrate while outputting the received audio file.

Case 4

In Case 4, the operation instruction causes the another terminal to perform, while outputting the input content, an operation independent from the output of the input content, such as, an operation on the another terminal itself.

For example, while outputting the input content, the another terminal may change a background color or resolution of the display screen using display screen setting software, or control a motor provided within a casing of the another terminal to vibrate.

The control operations which may be performed in response to the operation instruction have been described above. In the above embodiment, the second generating unit generates the operation instruction based on the gathered input parameter. In an embodiment of the present invention, the second generating unit further includes: a storage unit for storing correspondence between instructions and input parameters; and an instruction generating unit for obtaining an instruction corresponding to the gathered input operation based on the correspondence.

The following examples are given for explaining use of the mobile terminal according to the second embodiment.

For example, a first user and a second user use their own mobile terminals to communicate with each other. The first user keeps asking the second user the same question. In this case, the second user may become impatient. If the second user inputs the answer through a keyboard, his/her input parameter (keyboard pressing force or pressing frequency) at this time will be larger than the input parameter in a normal state. In this case, the mobile terminal of the second user generates an operation instruction based on the gathered input parameter using the second generating unit, and transmits it to the mobile terminal of the first user. The mobile terminal of the first user performs a control operation in response to the operation instruction, for example, to change the color of a character string transmitted from the mobile terminal of the second user to red color. The first user may know the second user's emotion from the red color of the displayed content.

As another example, the first user keeps asking the second user the same question. In this case, the second user may become impatient. If the second user inputs the answer through a keyboard, his/her input parameter (keyboard pressing force or pressing frequency) at this time will be larger than the input parameter in a normal state. In this case, the mobile terminal of the second user generates an operation instruction based on the gathered input parameter using the second generating unit, and transmits it to the mobile terminal of the first user. The mobile terminal of the first user performs a control operation in response to the operation instruction while displaying the character string transmitted from the mobile terminal of the second user. For example, a flame icon or a prompt of "Be careful, he/she is angry" may be appended to the displayed character string, or a prompt of "Be careful, he/she is angry." can be output audibly. The first user may know the second user's emotion from the red color of the displayed content.

As another example, the first user keeps asking the second user the same question. In this case, the second user may become impatient. If the second user inputs the answer as a voice, his/her input parameter (volume or speed) at this time will be larger than the input parameter in a normal state. In this case, the mobile terminal of the second user generates an operation instruction based on the gathered input parameter using the second generating unit, and transmits it to the mobile terminal of the first user. The mobile terminal of the first user performs a control operation in response to the operation instruction to play the audio file transmitted from the mobile terminal of the second user at an increased volume. In this way, the first user may know the second user's current emotion.

As another example, in an instant communication application, the first user keeps asking the second user the same question. In this case, the second user may become impatient. If the second user inputs the answer through a keyboard, his/her input parameter (keyboard pressing force or pressing frequency) at this time will be larger than the input parameter in a normal state. In this case, the mobile terminal of the second user generates an operation instruction based on the gathered input parameter using the second generating unit and transmits it to the mobile terminal of the first user. The mobile terminal of the first user performs a control operation in response to the operation instruction, to change the background color of the instant communication dialog box displayed on the display screen to the red color. The first user may know the second user's current emotion from the red color of the dialog box.

As another example, in an instant communication application, the first user keeps asking the second user the same question. In this case, the second user may become impatient. If the second user inputs the answer through a keyboard, his/her input parameter (keyboard pressing force or pressing frequency) at this time will be larger than the input parameter in a normal state. In this case, the mobile terminal of the second user generates an operation instruction based on the gathered input parameter using the second generating unit and transmits it to the mobile terminal of the first user. The mobile terminal of the first user performs a control operation in response to the operation instruction, to control its built-in motor to vibrate. In this way, the first user may know the second user's current emotion.

The present invention is not limited to the above examples. It can be understood by those skilled in the art that, for the first content input as a voice, operations similar to those described above can be performed.

In an embodiment of the present invention, a motor which can vibrate is provided in the another terminal and the control operation is performed by controlling the motor.

The another terminal is provided with a display unit configured to display an object and a display processing unit. The operation instruction causes the another terminal to control, via the display processing unit, the object to be displayed on the display unit in a vibrated manner.

Alternatively, the second gathering unit may gather an input parameter when the user performs the input operation and determine a vibration intensity parameter based on the input parameter.

The vibration intensity parameter can be carried in the operation instruction. The another terminal vibrates at a vibration intensity indicated by the vibration intensity parameter.

Of course, the input operation can be an operation performed by the user by controlling the mobile terminal to move. In this case, the second gathering unit may be a motion sensing unit for gathering the motion data of the mobile terminal, and the second generating unit may determine the vibration intensity parameter based on the motion data.

It should be noted that there may be no correspondence between the way in which the user inputs the content on the mobile terminal and the output of the input content by the another terminal. For example, the user may input the content through a microphone of the user terminal, while the another terminal may output it in a character string. As another example, the user may input the content through a keyboard of the user terminal, while the another terminal may output it audibly.

Figure 4:
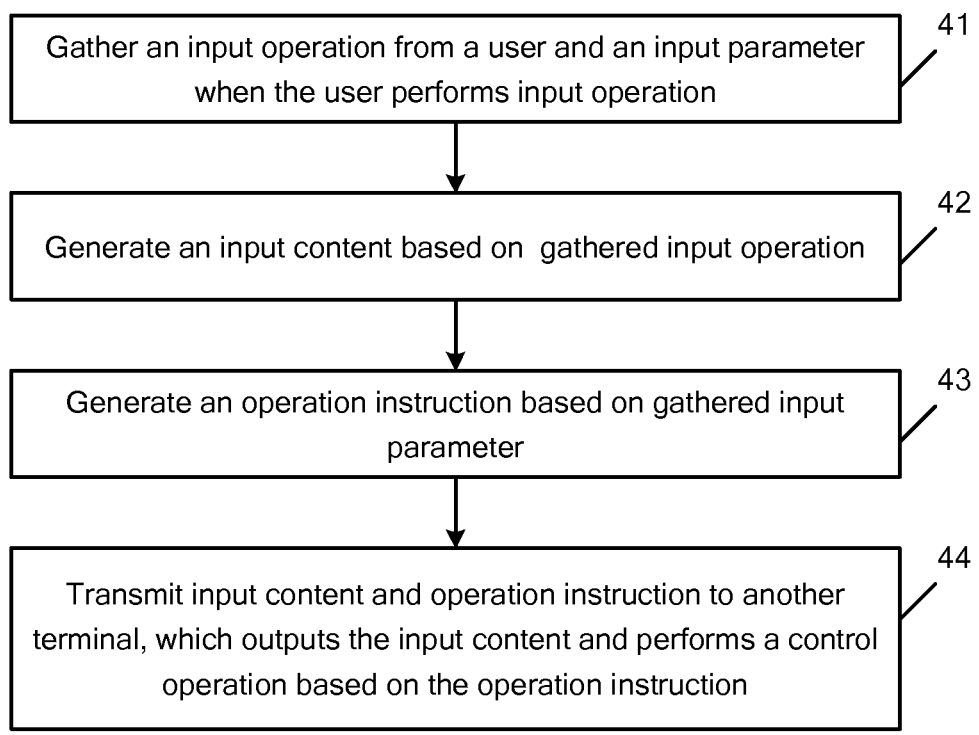
FIG. 4 is a flowchart illustrating a transmission processing method in the mobile terminal according to the second embodiment of the present invention.

FIG. 4 is a flowchart illustrating the transmission processing method in the mobile terminal according to the second embodiment of the present invention. As shown in FIG. 4, the method includes the following steps.

At step 41, an input operation by a user and an input parameter when the user performs the input operation are gathered.

At step 42, an input content is generated based on the gathered input operation.

At step 43, an operation instruction is generated based on the gathered input parameter.

At step 44, the input content and the operation instruction are transmitted to another terminal, and the another terminal outputs the input content and performs a control operation based on the operation instruction.

When the user inputs the content through a pointer input device, the input parameter is strength of force at which the pointer input device is pressed or a frequency at which the pointer input device is pressed.

When the user inputs the content through a voice gathering device, the input parameter is a volume or speed at which the user performs the voice input.

The operation instruction causes the another terminal to change an output parameter of the input content, or to output another content while outputting the input content, or to change an output environment for the input content, or to perform, while outputting the input content, an operation independent thereof.

When the input content is a content to be outputted by the another terminal in a character string form, the operation instruction causes the another terminal to: change a font, size, color or character format of the input content, or output another content while outputting the input content, or change a background color or a background image of a display box in which the input content is displayed or control the display box to vibrate while outputting the input content, or control a motor provided within a casing of the another terminal to vibrate.

When the input content is a content to be outputted by the another terminal in a voice form, the operation instruction causes the another terminal to change a volume, speed or mode for playing the input content, or output another content while outputting the input content, change a background color or a background image of an interface of a play unit for playing the input content, change a color, font or size of a filename of the input content displayed on the interface of the play unit, or control the interface to vibrate while outputting the input content, or control a motor provided within a casing of the another terminal to vibrate.

While the preferred embodiments of the present invention have been described above, it should be noted that a number of improvements and modifications can be made by those skilled in the art without departing from the principle of the present invention and these improvements and modifications should be encompassed by the scope of the present invention.

What is claimed is:

1. A mobile terminal, comprising:
   a casing;
   a motion sensing unit provided within the casing and configured to gather motion data of the mobile terminal;
   a judging unit connected to the motion sensing unit and configured to judge whether the mobile terminal is performing a predetermined motion based on the motion data gathered by the motion sensing unit;
   a generating unit connected to the judging unit and configured to generate an operation instruction when the judging unit judges that the mobile terminal is performing the predetermined motion; and
   a transmitting unit connected to the generating unit and configured to transmit the operation instruction together with content inputted by a user of the mobile terminal to another terminal, the another terminal performing a vibration operation in response to the operation instruction while outputting the content.

2. The mobile terminal of claim 1, wherein the another terminal is provided with a motor and the operation instruction causes the another terminal to control the motor to perform the vibration operation.

3. The mobile terminal of claim 1, wherein the another terminal is provided with a display unit configured to display an object and a display processing unit, and the operation instruction causes the another terminal to control, via the display processing unit, the object to be displayed on the display unit in a vibrated manner.

4. The mobile terminal of claim 1, wherein the generating unit comprises:
   a vibration intensity parameter determining unit configured to determine a vibration intensity parameter based on the motion data;
   wherein the vibration intensity parameter is included in the operation instruction, and the another terminal vibrates at a vibration intensity indicated by the vibration intensity parameter.

5. A transmission processing method in a mobile terminal, comprising:
   gathering motion data of the mobile terminal;
   judging whether the mobile terminal is performing a predetermined motion based on the gathered motion data;
   generating an operation instruction when it is judged that the mobile terminal is performing the predetermined motion; and
   transmitting the operation instruction together with content inputted by a user of the mobile terminal to another terminal, the another terminal performing a vibration operation in response to the operation instruction while outputting the content.

6. The method of claim 5, wherein the another terminal is provided with a motor and the operation instruction causes the another terminal to control the motor to vibrate, or the another terminal is provided with a display unit configured to display an object and a display processing unit, and the operation instruction causes the another terminal to control, via the display processing unit, the object to be displayed on the display unit in a vibrated manner.

* * * * *